(12) United States Patent
Hoshiba

(10) Patent No.: US 8,747,280 B2
(45) Date of Patent: Jun. 10, 2014

(54) CONTROL DEVICE FOR VEHICLE

(71) Applicant: Takeshi Hoshiba, Anjo (JP)

(72) Inventor: Takeshi Hoshiba, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 29 days.

(21) Appl. No.: 13/661,402

(22) Filed: Oct. 26, 2012

(65) Prior Publication Data

US 2013/0109531 A1 May 2, 2013

(30) Foreign Application Priority Data

Oct. 27, 2011 (JP) ................................. 2011-236222

(51) Int. Cl.
*B60W 10/04* (2006.01)
*B60W 10/10* (2012.01)

(52) U.S. Cl.
USPC ....................................................... 477/115

(58) Field of Classification Search
CPC ..... B60W 10/06; B60W 10/08; B60W 10/10; B60W 10/113; B60W 10/115; B60W 20/30; B60W 2510/1075; B60W 2710/1005
USPC ............................................. 477/6, 115, 156
See application file for complete search history.

(56) References Cited

U.S. PATENT DOCUMENTS

| 7,670,253 B2* | 3/2010 | Sah ................................... 477/3 |
| 2009/0088291 A1* | 4/2009 | Kumazaki et al. .............. 477/35 |
| 2010/0204008 A1* | 8/2010 | Azuma et al. ................. 477/115 |

FOREIGN PATENT DOCUMENTS

| JP | 2007-216833 A | 8/2007 |
| JP | 2010-120639 A | 6/2010 |
| JP | 2011-052795 A | 3/2011 |
| JP | 2011-116367 A | 6/2011 |

* cited by examiner

*Primary Examiner* — Edwin A Young
(74) *Attorney, Agent, or Firm* — Gifford, Krass, Sprinkle, Anderson & Citkowski, P.C.

(57) ABSTRACT

There is provided a control device for a vehicle that includes: a driving force source; a hydraulic transmission; and an interrupting mechanism that is able to interrupt power transmission from the driving force source to a drive wheel. The control device includes a controller that is configured to, after the driving force source is stopped while the vehicle is travelling, on the condition that a hydraulic pressure applied to the transmission has decreased, execute control for setting a speed ratio of the transmission to a predetermined low speed ratio, such as a high-speed gear in the case where a low-speed gear and the high-speed gear are provided, while the vehicle is travelling.

14 Claims, 9 Drawing Sheets

|  | SLB1 | SLB2 | B1 | B2 |
|---|---|---|---|---|
| LOW-SPEED GEAR Lo | ○ | ○ | × | ○ |
| HIGH-SPEED GEAR Hi | × | × | ○ | × |

CONTROL DEVICE FOR VEHICLE

INCORPORATION BY REFERENCE

The disclosure of Japanese Patent Application No. 2011-236222 filed on Oct. 27, 2011 including the specification, drawings and abstract is incorporated herein by reference in its entirety.

BACKGROUND OF THE INVENTION

1. Field of the Invention

The invention relates to a control device for a vehicle and, more particularly, to a control device for a vehicle that includes an engine and an electric motor as driving force sources and in which the electric motor is coupled to a drive wheel via a transmission.

2. Description of Related Art

In recent years, in terms of environmental protection, it is desired to reduce the amount of emission of exhaust gas from an engine (internal combustion engine) mounted on a vehicle and to improve a fuel consumption rate (fuel economy). As a vehicle that satisfies these requirements, a hybrid vehicle equipped with a hybrid system that includes an engine and an electric motor as driving force sources has been practically used.

There is, for example, known one hybrid system mounted on a vehicle (for example, see Japanese Patent Application Publication No. 2010-120639 (JP 2010-120639 A)). The system includes a power split mechanism, a second motor generator, a transmission and an electrical storage device (battery). The power split mechanism includes a sun gear, a ring gear and a planetary carrier (pinions) as rotating elements. The power split mechanism distributes the output of an engine to a first motor generator and a transmission shaft (ring gear shaft) (or combines the output of the engine and the output of the first motor generator and then outputs the combined output to the transmission shaft). The transmission is provided between the second motor generator and drive wheels (output shaft). The electrical storage device is able to exchange electric power with the first and second motor generators. Power from the second motor generator is output to the drive wheels via the transmission.

In addition, some transmissions applied to hybrid vehicles set a gear (speed ratio) with the use of clutches and/or brakes, which are frictional engagement elements, and a planetary gear unit. For example, there is an automatic transmission that includes two hydraulic brakes as frictional engagement elements and that shifts between a gear at which one of the brakes is engaged and the other one of the brakes is released (for example, low-speed gear) and a gear at which the other one of the brakes is engaged and the one of the brakes is released (for example, high-speed gear). Then, a hydraulic pressure for engaging or releasing the frictional engagement elements (brakes) of such a transmission is supplied by a mechanical oil pump that is driven by the power of an engine or an electric oil pump that is driven by an electric motor.

Note that, in a hybrid vehicle, there is the following technique described in Japanese Patent Application Publication No. 2007-216833 (JP 2007-216833 A) as a technique for starting or stopping a hybrid system. In the technique described in JP 2007-216833 A, when a vehicle start/stop switch is operated to an engine stop position (Off position or Ready-Off position) while the vehicle is travelling at a high speed, an engine stop is prohibited. By so doing, the amount of discharge of a battery does not exceed an upper limit discharge amount. Thus, the battery is protected.

Incidentally, in the above-described hybrid vehicle, when a user (driver, or the like) operates to stop the hybrid system (performs IG-Off operation) while travelling, the engine may stop. When the engine stops, the oil pump (mechanical oil pump, electric oil pump, or the like) also stops, a hydraulic pressure applied to the transmission decreases, causing the engaged frictional engagement element to be released. After that (after IG-Off while travelling), when restart operation (IG-On operation) is performed, the engine is restarted. When the engine is restarted, the hydraulic pressure applied to the transmission (hydraulic control circuit) rises accordingly, causing the frictional engagement element of the transmission to be engaged. At this time, the output shaft of the transmission is driven for rotation by the drive wheels, so there is a difference between the rotation speed of the output shaft and the rotation speed of an input shaft (motor generator side) of the transmission. When the transmission is engaged in such a state where there is a difference in rotation speed, a shock may occur at the time of the engagement. In addition, there is a concern about a drag of an engagement portion (frictional engagement element) of the transmission.

As measures against the above inconveniences, at the time of starting the engine, it is conceivable to execute control (synchronization control) for driving the second motor generator to cause the input-side rotation speed of the transmission to match with the output-side rotation speed of the transmission. In this case, when the second motor generator cannot be driven (torque cannot be output) due to an output limit (Wout) of the battery at low temperatures, or the like, it is not possible to reduce an engagement shock at the time of a restart or a drag of the engagement portion.

Note that the technique described in JP 2007-216833 A is a technique for, when the vehicle start/stop switch is operated to the engine stop position while the vehicle is travelling at a high speed, an engine stop is forcibly prohibited and does not take into consideration the case where IG-On operation is performed after an engine stop and, in addition, a decrease in hydraulic pressure in the transmission due to an engine stop while travelling is also not taken into consideration.

SUMMARY OF THE INVENTION

The invention provides a control device for a vehicle, which is able to reduce an engagement shock of a transmission and a drag of an engagement portion of the transmission, which occur when a driving force source stops while the vehicle is travelling and then the driving force source is restarted.

An aspect of the invention provides a control device for a vehicle that includes: a driving force source; a hydraulic transmission; and an interrupting mechanism that is able to interrupt power transmission from the driving force source to a drive wheel. The control device includes a controller that is configured to, after the driving force source is stopped while the vehicle is travelling, on the condition that a hydraulic pressure applied to the transmission has decreased, execute control for setting a speed ratio of the transmission to a predetermined low speed ratio or, specifically, setting the speed ratio of the transmission to a minimum speed ratio while the vehicle is travelling.

In addition, in the control device, the controller may be applied to the vehicle that includes an engine and an electric motor as the driving force source and the hydraulic transmission and in which the electric motor is coupled to the drive wheel via the transmission, and the controller may be configured to, after the driving force source is stopped while the vehicle is travelling, on the condition that the hydraulic pressure applied to the transmission has decreased, execute control for setting the speed ratio of the transmission to the predetermined low speed ratio or setting the speed ratio to a minimum speed ratio while the vehicle is travelling.

With the thus configured control device, after the driving force source is stopped while the vehicle is travelling, when the hydraulic pressure of the transmission has decreased, the controller executes control for setting the speed ratio of the transmission to the predetermined low speed ratio or setting the speed ratio to the minimum speed ratio while the vehicle is travelling. Therefore, after the driving force source is stopped, when the driving force source (engine) is restarted and the hydraulic pressure applied to the transmission has risen, the speed ratio of the transmission is the predetermined small speed ratio (for example, a high-speed gear Hi). In this way, by setting the speed ratio of the transmission to the predetermined low speed ratio or the minimum speed ratio, even when there is a difference in the rotation speed of an input shaft of the transmission and an output shaft of the transmission at the time of a restart of the driving force source (engine) while the vehicle is travelling, it is possible to reduce an engagement shock due to the difference in rotation speed and a drag of an engagement portion (frictional engagement element). In addition, even when the motor generator coupled to the transmission cannot be driven (torque cannot be output) due to an output limit (Wout) of a battery at low temperatures, or the like, it is possible to reduce an engagement shock and a drag of the engagement portion at the time of a restart of the driving force source (engine) after the driving force source is stopped (after IG-Off) while travelling.

In the control device, the controller may be configured to, after the driving force source is stopped (IG-Off) while the vehicle is travelling, only on the condition that a decrease in the hydraulic pressure of the transmission, execute control for setting the speed ratio of the transmission to the predetermined low speed ratio or setting the speed ratio to a minimum speed ratio while the vehicle is travelling and then restart the driving force source (engine) while the vehicle is travelling. In addition, the controller may be configured to, after the driving force source is stopped (IG-Off) while the vehicle is travelling, on the condition that there is a request to restart the driving force source (IG-Off→IG-On) and the hydraulic pressure applied to the transmission has decreased, execute control for setting the speed ratio of the transmission to the predetermined low speed ratio or setting the speed ratio to a minimum speed ratio while the vehicle is travelling and then restart the driving force source (engine) while the vehicle is travelling.

An example configuration of the invention may be configured to change the speed ratio by engaging or releasing a plurality of frictional engagement elements that are examples of a plurality of "interrupting mechanisms" of the transmission by a hydraulic pressure supplied from an oil pump (a mechanical oil pump and/or an electric oil pump), and includes a hydraulic pressure decrease detecting unit that detects that all the hydraulic pressures respectively applied to the plurality of frictional engagement elements of the transmission have decreased to a hydraulic pressure at which the frictional engagement elements are released. Then, the controller may be configured to, after the driving force source is stopped while the vehicle is travelling, when the hydraulic pressure decrease detecting unit has detected a decrease in the hydraulic pressure applied to the transmission, execute control for setting the speed ratio of the transmission to the predetermined low speed ratio or setting the speed ratio to a minimum speed ratio while the vehicle is travelling. In this case, the hydraulic pressure decrease detecting unit may be, for example, a hydraulic pressure switch that detects the hydraulic pressures respectively applied to the frictional engagement elements of the transmission.

In the control device, the controller may be configured to, after IG-Off while travelling, when a decrease in the hydraulic pressure applied to the transmission has been detected, execute control for setting the speed ratio of the transmission to a minimum speed ratio or setting a gear of the transmission to a highest gear while the vehicle is travelling. When it is possible to reduce a shock and a drag of the engagement portion at the time when the transmission is engaged, the controller may be configured to execute control for setting the speed ratio of the transmission to a speed ratio larger than the minimum speed ratio or setting the gear to a gear lower by, for example, one than the highest gear.

Another aspect of the invention provides a control device for a vehicle that includes: a driving force source; a transmission that is shiftable by supplied oil; a driving force transmission mechanism that is engaged by supplied oil; an oil passage change unit that at least changes oil passages of oil supplied to the transmission; an oil pump that supplies oil to the transmission and the driving force transmission mechanism; and an operating unit that accepts operation to start and stop a system of the vehicle. The control device includes a controller that is configured to, while the vehicle is travelling, after the system of the vehicle is stopped by operating the operating unit and, accordingly, an amount of discharge of the oil pump is reduced, regulate the oil passage change unit to the oil passage that decreases a speed ratio of the transmission.

In this configuration, the controller may be configured to, after the system of the vehicle is stopped by operating the operating unit and, accordingly, the amount of discharge of the oil pump is reduced, and when a restart command is issued by operating the operating unit again, change the oil passage change unit and then allow a restart of the system or carry out a restart (start the engine when a mechanical oil pump driven by the engine is provided, and restart the system when an electric oil pump driven by electric power supplied through system startup).

With the thus configured control device, after the system of the vehicle is stopped by operating the operating unit (for example, a power switch) and, accordingly, the amount of discharge of the oil pump is reduced, the oil passage change unit is regulated to the oil passage that decreases the speed ratio of the transmission or sets the speed ratio to a minimum speed ratio. Therefore, after operation to stop the system of the vehicle is conducted, when the system of the vehicle is restarted and the hydraulic pressure applied to the transmission has risen, the speed ratio of the transmission is set to the predetermined low speed ratio (for example, a high-speed gear Hi). In this way, by setting the speed ratio of the transmission to the predetermined low speed ratio, even when there is a difference in the rotation speed of an input shaft of the transmission and an output shaft of the transmission at the time of a restart of the vehicle system while the vehicle is travelling, it is possible to reduce an engagement shock due to the difference in rotation speed and a drag of an engagement portion (frictional engagement element). In addition, even when the motor generator coupled to the transmission cannot be driven (torque cannot be output) due to an output limit (Wout) of a battery at low temperatures, or the like, it is possible to reduce an engagement shock and a drag of the engagement portion at the time of a restart of the driving force source (engine) after the driving force source is stopped (after IG-Off) while travelling.

In this configuration, a driving force transmission mechanism that is engaged by supplied oil may be formed of a frictional engagement element of the transmission, or the driving force transmission mechanism may be, for example, provided in a power transmission path between the driving force source and the transmission.

According to the aspects of the invention, after the driving force source is stopped while the vehicle is travelling, on the condition that a hydraulic pressure applied to the transmission has decreased, control for setting a speed ratio of the transmission to a predetermined low speed ratio is executed while the vehicle is travelling. Therefore, it is possible to reduce an engagement shock of the transmission and a drag of the engagement portion, which occur at the time when the driving force source is restarted while the vehicle is travelling.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
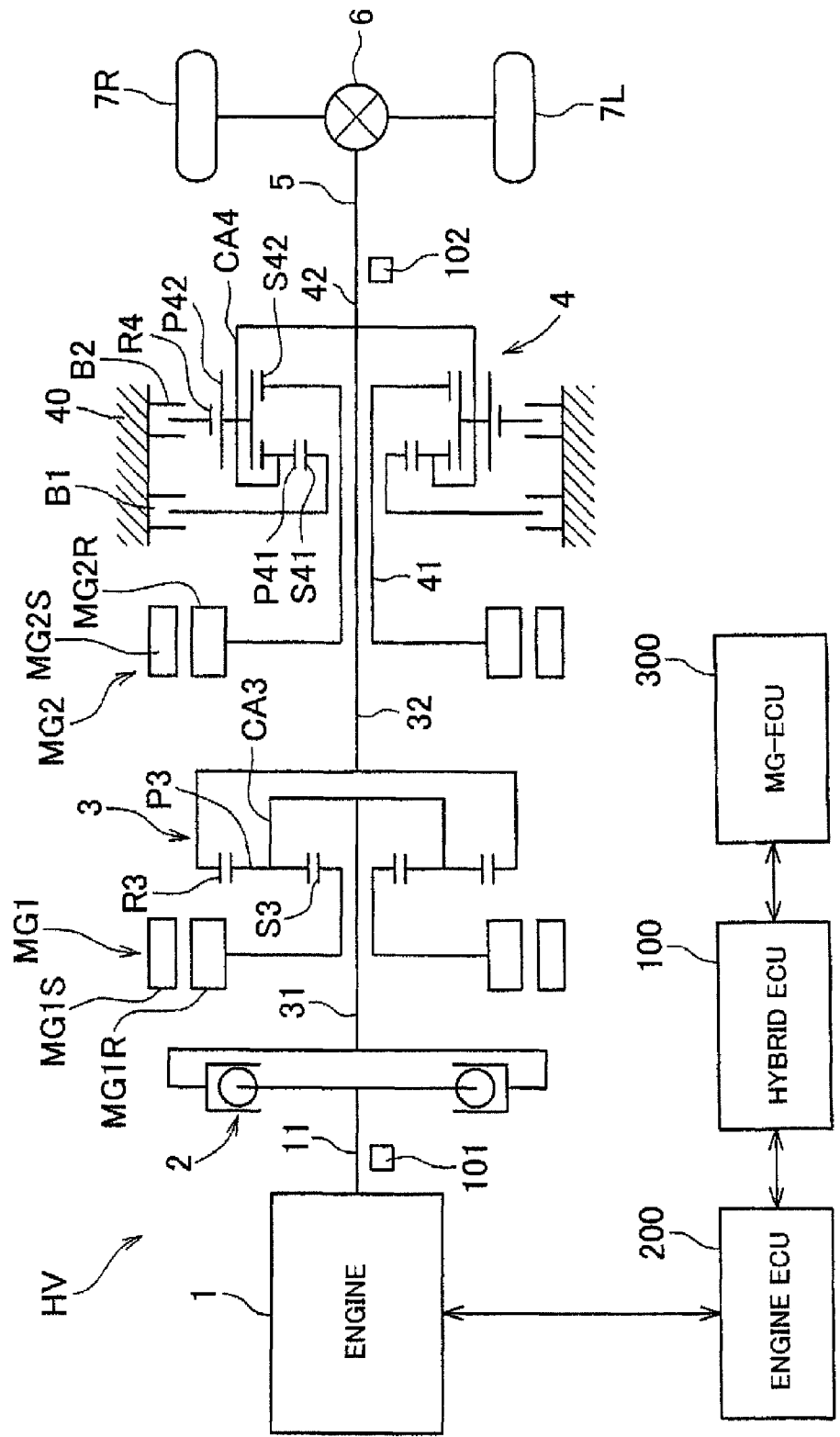
FIG. 1 is a schematic configuration diagram that shows an example of a vehicle to which a control device according to an embodiment of the invention is applied.

Hereinafter, an embodiment of the invention will be described with reference to the accompanying drawings. FIG. 1 is a schematic configuration diagram that shows an example of a vehicle to which the embodiment of the invention is applied.

The vehicle in this example is a front-engine rear-drive (FR) hybrid vehicle HV, and includes, as a drive system, an engine (internal combustion engine) 1, a first motor generator MG1, a second motor generator MG2, a power split mechanism 3, a transmission 4, a differential unit 6, drive wheels (rear wheels) 7R and 7L, driven wheels (front wheels, not shown), and the like. The first motor generator MG1 mainly functions as a generator. The second motor generator MG2 mainly functions as an electric motor. In addition, the vehicle includes, as a control system, a hybrid electronic control unit (ECU) 100, an engine ECU 200, an MG_ECU 300, and the like. These hybrid ECU 100, engine ECU 200 and MG_ECU 300 are communicably connected to one another.

Next, various portions of the engine 1, motor generators MG1 and MG2, power split mechanism 3, transmission 4, ECUs 100, 200 and 300, and the like, will be described below.

The engine 1 is a known power device, such as a gasoline engine and a diesel engine, that burns fuel to output power, and is, for example, configured to be able to control an operation state, such as a throttle opening degree (intake air flow rate) of a throttle valve (not shown) provided in an intake passage, a fuel injection amount and an ignition timing. The operation state of the engine 1 is controlled by the engine ECU 200. The engine ECU 200 executes various controls over the engine 1, including the above described intake air flow rate control, fuel injection amount control and ignition timing control, in response to an output request from the hybrid ECU 100.

The output of the engine 1 is transmitted to an input shaft 31 of the power split mechanism 3 via a crankshaft 11 and a damper 2. The damper 2 is, for example, a coil spring transaxle damper, and absorbs torque fluctuations of the engine 1. The rotation speed of the crankshaft 11 that is an output shaft of the engine 1 is detected by an engine rotation speed sensor 101.

A mechanical oil pump 401 (see FIG. 6) (described later) is coupled to the crankshaft 11 of the engine 1.

The first motor generator MG1 is an alternating-current synchronous generator that includes a rotor MG1R and a stator MG1S. The rotor MG1R is formed of a permanent magnet and is rotatably supported by the input shaft 31. Three-phase coils are wound on the stator MG1S. The first motor generator MG1 not only functions as a generator but also functions as an electric motor. In addition, similarly, the second motor generator MG2 is also an alternating-current synchronous generator that includes a rotor MG2R formed of a permanent magnet and a stator MG2S on which three-phase coils are wound. The second motor generator MG2 not only functions as an electric motor but also functions as a generator.

Figure 2:
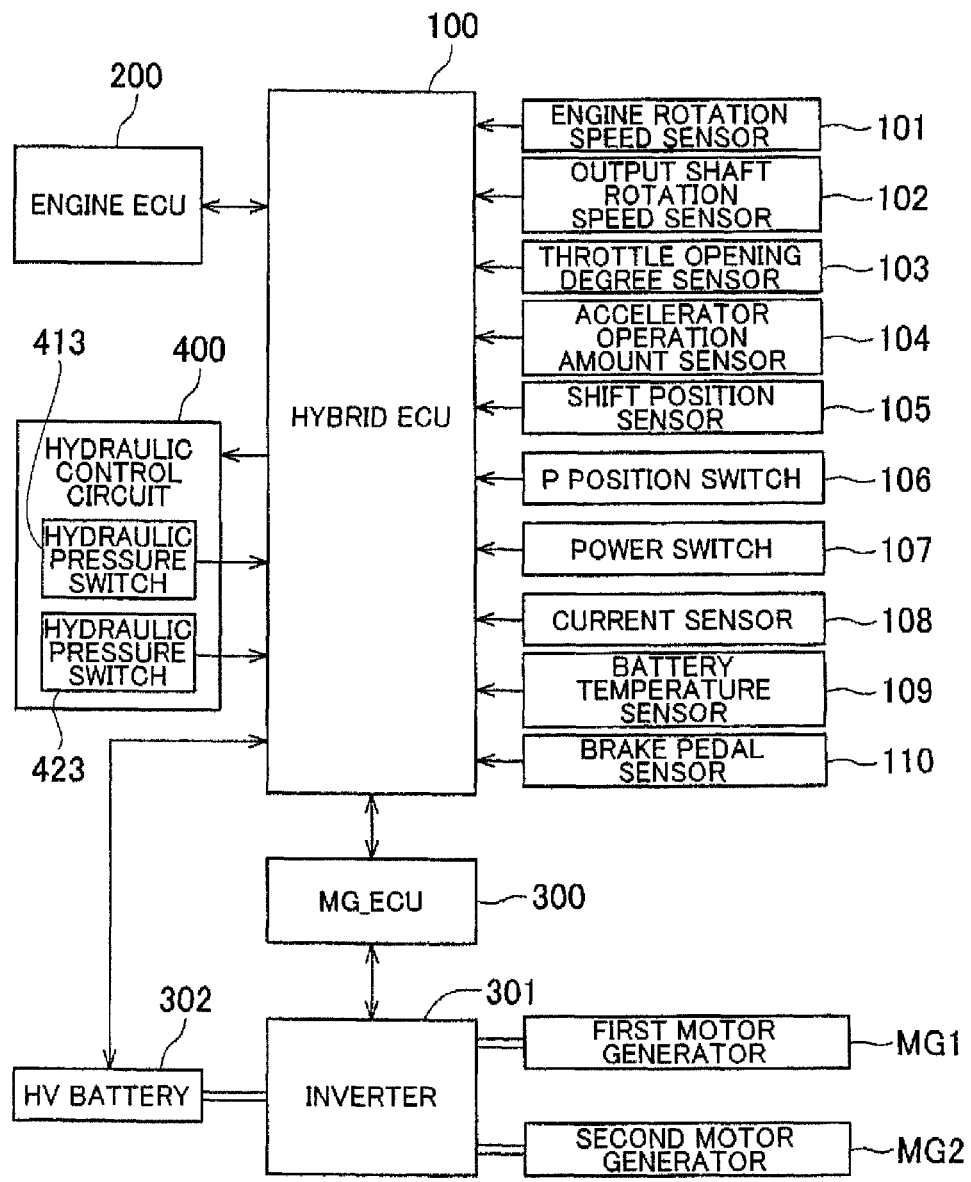
FIG. 2 is a block diagram that shows the configuration of a control system, such as an ECU, provided in a controller of the control device.

As shown in FIG. 2, the first motor generator MG1 and the second motor generator MG2 each are connected to an HV battery (electrical storage device) 302 via an inverter 301. The inverter 301 is controlled by the MG_ECU 300.

The inverter 301 includes intelligent power modules (IPMs) for respectively controlling the motor generators MG1 and MG2. Each of the IPMs is formed of a plurality of (for example, six) semiconductor switching elements (for example, insulated gate bipolar transistors (IGBTs)), and the like.

The MG_ECU 300 controls the inverter 301 in response to an output request from the hybrid ECU 100 and controls power running or regeneration of each of the motor generators MG1 and MG2. Specifically, for example, the MG_ECU 300 converts direct current from the HV battery 302 to alternating current for driving the motor generators MG1 and MG2, while the MG_ECU 300 converts alternating current generated by the first motor generator MG1 through the power of the engine 1 and alternating current generated by the second motor generator MG2 through regenerative braking to direct current for charging the HV battery 302. In addition, alternating current generated by the first motor generator MG1 is supplied as electric power for driving the second motor generator MG2 depending on a travelling state.

As shown in FIG. 1, the power split mechanism 3 is a planetary gear mechanism that includes a sun gear S3, a ring gear R3, a plurality of pinions P3 and a planetary carrier CA3. The sun gear S3 is an external gear. The ring gear R3 is an internal gear arranged concentrically with the sun gear S3. The plurality of pinions P3 are in mesh with these sun gear S3 and the ring gear R3. The planetary carrier CA3 retains the plurality of pinions P3 such that the pinions P3 are rotatable and revolvable. The power split mechanism 3 performs differential action with the use of these sun gear S3, ring gear R3 and planetary carrier CA3 as rotating elements.

In the power split mechanism 3 shown in FIG. 1, the planetary carrier CA3 is an input element, and the planetary carrier CA3 is coupled to the crankshaft 11 of the engine 1 via the input shaft 31 and the damper 2. In addition, the sun gear S3 is a reaction element, and the rotor MG1R (rotary shaft) of the first motor generator MG1 is coupled to the sun gear S3. Then, the ring gear R3 is an output element, and a ring gear shaft 32 is coupled to the ring gear R3. The ring gear shaft 32 is coupled to the right and left drive wheels 7R and 7L via an output shaft 42 of the transmission 4, a propeller shaft 5, the differential unit 6, and the like.

Figure 3:
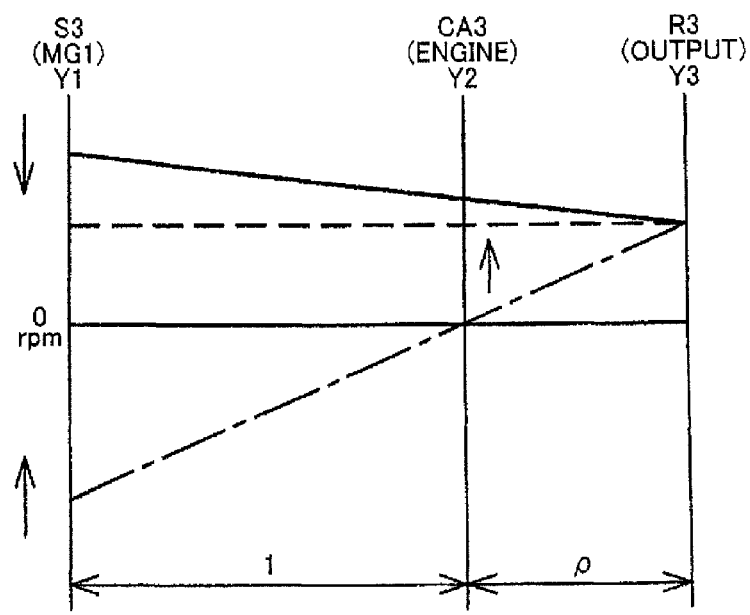
FIG. 3 is a nomograph that shows a relative relationship in rotation speed among rotating elements of a power split mechanism mounted on the vehicle shown in FIG. 1.

FIG. 3 shows a nomograph of the power split mechanism 3. In the nomograph of FIG. 3, the ordinate axis Y1, the ordinate axis Y2 and the ordinate axis Y3 respectively represent the rotation speed of the sun gear S3 (MG1), the rotation speed of the planetary carrier CA3 (engine 1) and the rotation speed of the ring gear R3 (output, the ring gear shaft 32), and mutual distances between the ordinate axis Y1, the ordinate axis Y2 and the ordinate axis Y3 are set such that, when a distance between the ordinate axis Y1 and the ordinate axis Y2 is set to "1", a distance between the ordinate axis Y2 and the ordinate axis Y3 becomes a gear ratio ρ (the number of teeth $Z_S$ of the sun gear S3/the number of teeth $Z_R$ of the ring gear R3).

Then, in the thus configured power split mechanism 3, when reaction torque generated by the first motor generator MG1 against the output torque of the engine 1, input to the planetary carrier CA3, is input to the sun gear S3, torque larger than the torque input from the engine 1 appears in the ring gear R3 that serves as the output element. In this case, the first motor generator MG1 functions as a generator.

In addition, when the rotation speed of the ring gear R3 (output shaft rotation speed) is constant, by changing the rotation speed of the first motor generator MG1 up or down, it is possible to continuously (steplessly) change the rotation speed of the engine 1. For example, by executing drive control over the first motor generator MG1, it is possible to execute control for setting the rotation speed of the engine 1 to a rotation speed at which fuel economy is the best. Note that the broken line shown in FIG. 3 indicates a state where, when the rotation speed of the first motor generator MG1 is decreased from a value indicated by the solid line, the rotation speed of the engine 1 decreases.

In addition, as indicated by the alternate long and short dash line in FIG. 3, the first motor generator MG1 is rotating in the reverse direction in a state where the engine 1 is stopped while the hybrid vehicle HV is travelling, and, when the first motor generator MG1 is caused to function as an electric motor in this state to output torque in a forward rotation direction, torque in a direction to rotate the engine 1 forward acts on the engine 1 coupled to the planetary carrier CA3. Thus, it is possible to start (motor or crank) the engine 1 with the use of the first motor generator MG1. In this case, torque in a direction to stop the rotation of the ring gear shaft 32 acts on the ring gear shaft 32, so it is possible to keep driving torque for driving the vehicle by controlling the output torque of the second motor generator MG2, and it is possible to smoothly start the engine 1 at the same time. Note that this hybrid type is called a mechanical distribution type or a split type.

As shown in FIG. 1, the transmission 4 is formed of a set of Ravigneaux planetary gear mechanism. Specifically, the transmission 4 includes a front sun gear S41, a rear sun gear S42, short pinions P41, long pinions P42, and the like. The short pinions P41 are in mesh with the front sun gear S41, and the short pinions P41 and the rear sun gear S42 are in mesh with the long pinions P42.

The long pinions P42 are in mesh with the ring gear R4 arranged concentrically with the sun gears S41 and S42. The short pinions P41 and the long pinions P42 are retained by the planetary carrier CA4 so as to be rotatable and revolvable. Then, a double-pinion-type planetary gear mechanism is formed of the front sun gear S41, the ring gear R4, the short pinions P41 and the long pinions P42. In addition, a single-pinion-type planetary gear mechanism is formed of the rear sun gear S42, the ring gear R4 and the long pinions P42.

In the thus configured transmission 4, the rear sun gear S42 serves as an input element, and the rear sun gear S42 is coupled to the rotor MGR2 (rotary shaft) of the second motor generator MG2 via the input shaft 41. In addition, the planetary carrier CA4 is an output element, and the output shaft 42 is coupled to the planetary carrier CA4. The rotation speed of the output shaft 42 (output shaft rotation speed) is detected by an output shaft rotation speed sensor 102.

Then, the front sun gear S41 of the transmission 4 is selectively coupled to a housing 40, which is a non-rotating member, via a brake B1, and the rotation of the front sun gear 41 is blocked by engaging the brake B1. In addition, the ring gear R4 of the transmission 4 is selectively coupled to the housing 40, which is the non-rotating member, via a brake B2, and the rotation of the ring gear R4 is blocked by engaging the brake B2. These brakes B1 and B2 are frictional engagement elements that generate engagement force based on friction force, and are, for example, multi-disc-type frictional engagement elements or band-type frictional engagement elements. The brakes B1 and B2 are respectively configured such that torque capacities continuously vary with engagement forces generated by a hydraulic actuator for the brake 81, such as a hydraulic cylinder, and a hydraulic actuator for the brake B2, such as a hydraulic cylinder.

Note that the frictional engagement elements that constitute the transmission 4 each are an example of an "interrupting mechanism that is able to interrupt power transmission from a driving force source to a drive wheel" according to the invention. In addition, the frictional engagement elements that constitute the transmission 4 each are an example of a "driving force transmission mechanism that is engaged by supplied oil" according to the invention.

Figure 4:
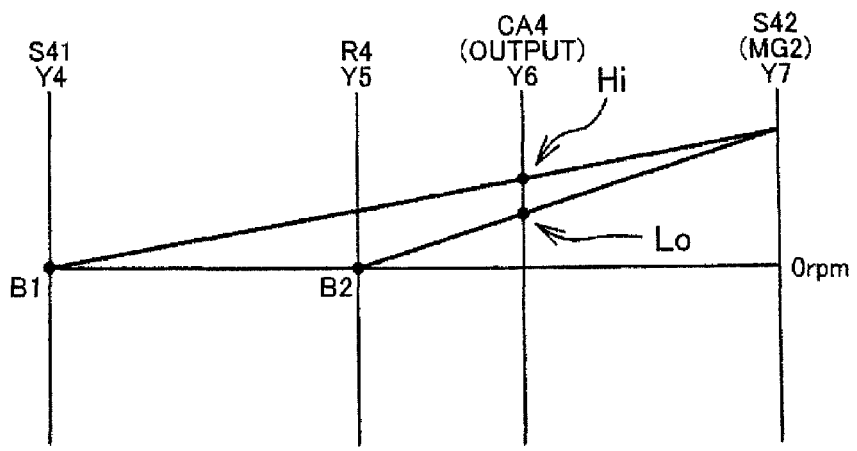
FIG. 4 is a nomograph that shows a relative relationship in rotation speed among rotating elements of a Ravigneaux planetary gear mechanism that constitutes a transmission mounted on the vehicle shown in FIG. 1.

FIG. 4 shows a nomograph of the transmission 4. In the nomograph of FIG. 4, the ordinate axis Y4, the ordinate axis Y5, the ordinate axis Y6 and the ordinate axis Y7 respectively represent the rotation speed of the front sun gear S41, the rotation speed of the ring gear R4, the rotation speed of the planetary carrier CA4 (output shaft 42) and the rotation speed of the rear sun gear S42 (MG2).

Then, in the thus configured transmission 4, by engaging or releasing the brakes B1 and B2 into a predetermined state, a gear (high-speed gear Hi or low-speed gear Lo) is set.

Figures 7, 8:
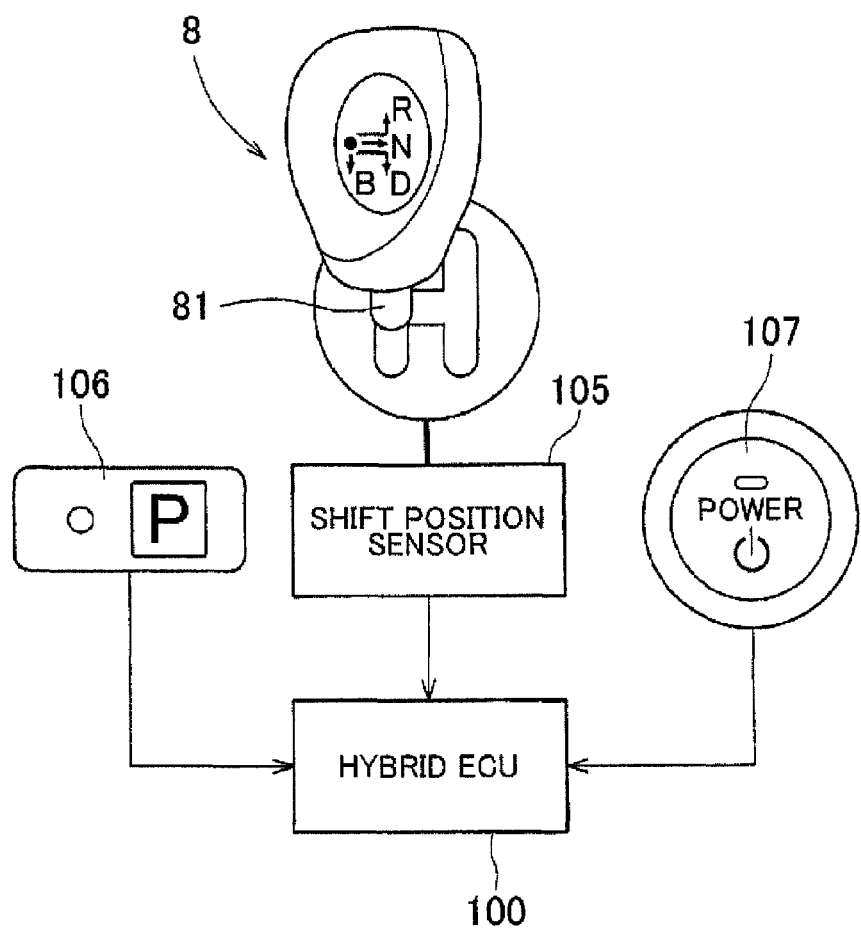
FIG. 7 is an operation chart that shows a relationship between gears of the transmission mounted on the vehicle shown in FIG. 1 and operation states of linear solenoid valves and brakes for forming those gears.
FIG. 8 is a schematic view that shows a shift operating device of the vehicle shown in FIG. 1.

Specifically, by engaging the brake B1 and releasing the brake B2, the high-speed gear Hi having a speed ratio higher than "1" is set (see FIG. 4 and FIG. 7). That is, when the brake B1 is engaged, the rotation of the front sun gear S41 is fixed, and the planetary carrier CA4 (output shaft 42) rotates at a high speed by the front sun gear S41, of which the rotation is fixed, and the rotation of the rear sun gear S42 (ring gear R4) rotated by the second motor generator MG2.

On the other hand, by engaging the brake B2 and releasing the brake B1, the low-speed gear Lo having a speed ratio higher than the high-speed gear Hi is set (see FIG. 4 and FIG. 7). That is, when the brake B2 is engaged, the rotation of the ring gear R4 is fixed, and the planetary carrier CA4 (output shaft 42) rotates at a low speed by the ring gear R4, of which the rotation is fixed, and the rear sun gear S42 that is rotated by the second motor generator MG2. Hydraulic pressures at the time when the brakes B1 and B2 of the transmission 4 are engaged or released are controlled by a hydraulic control circuit 400 (see FIG. 6) (described later).

Figure 5:
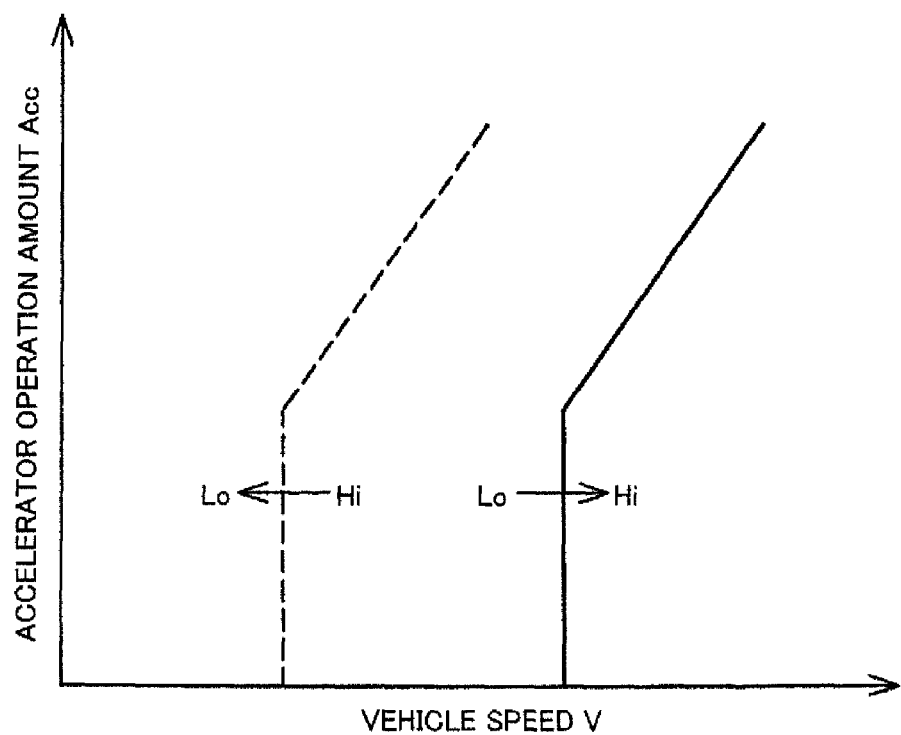
FIG. 5 is a graph that shows an example of a shift map of the transmission.

The above-described process of shifting the transmission 4 is executed on the basis of a vehicle speed V and an accelerator operation amount Acc by consulting a shift map shown in FIG. 5.

In the shift map shown in FIG. 5, an upshift line (shift line) is indicated by the solid line, and a downshift line (shift line) is indicated by the broken line. In the shift map shown in FIG. 5, when the operation state (the vehicle speed V and the accelerator operation amount Acc) crosses the upshift line indicated by the solid line and the state changes from a left-side region to a right-side region in FIG. 5, the process of shifting the gear of the transmission 4 from the low-speed gear Lo to the high-speed gear Hi (upshift process) is executed. On the other hand, when the operation state of the vehicle crosses the downshift line indicated by the broken line and the state changes from the right-side region to the left-side region in FIG. 5, the process of shifting the gear of the transmission 4 from the high-speed gear Hi to the low-speed gear Lo (downshift process) is executed. Such shift control over the transmission 4 is executed by the hybrid ECU 100.

Note that it is possible to calculate the vehicle speed V, used in the above-described shift control, from the output signal of the output shaft rotation speed sensor 102 (see FIG. 1 and FIG. 2). In addition, it is possible to obtain the accelerator operation amount Acc from the output signal of an accelerator operation amount sensor 104 (see FIG. 2). Note that the vehicle speed V may be obtained from the output signal of a vehicle speed sensor.

Figure 6:
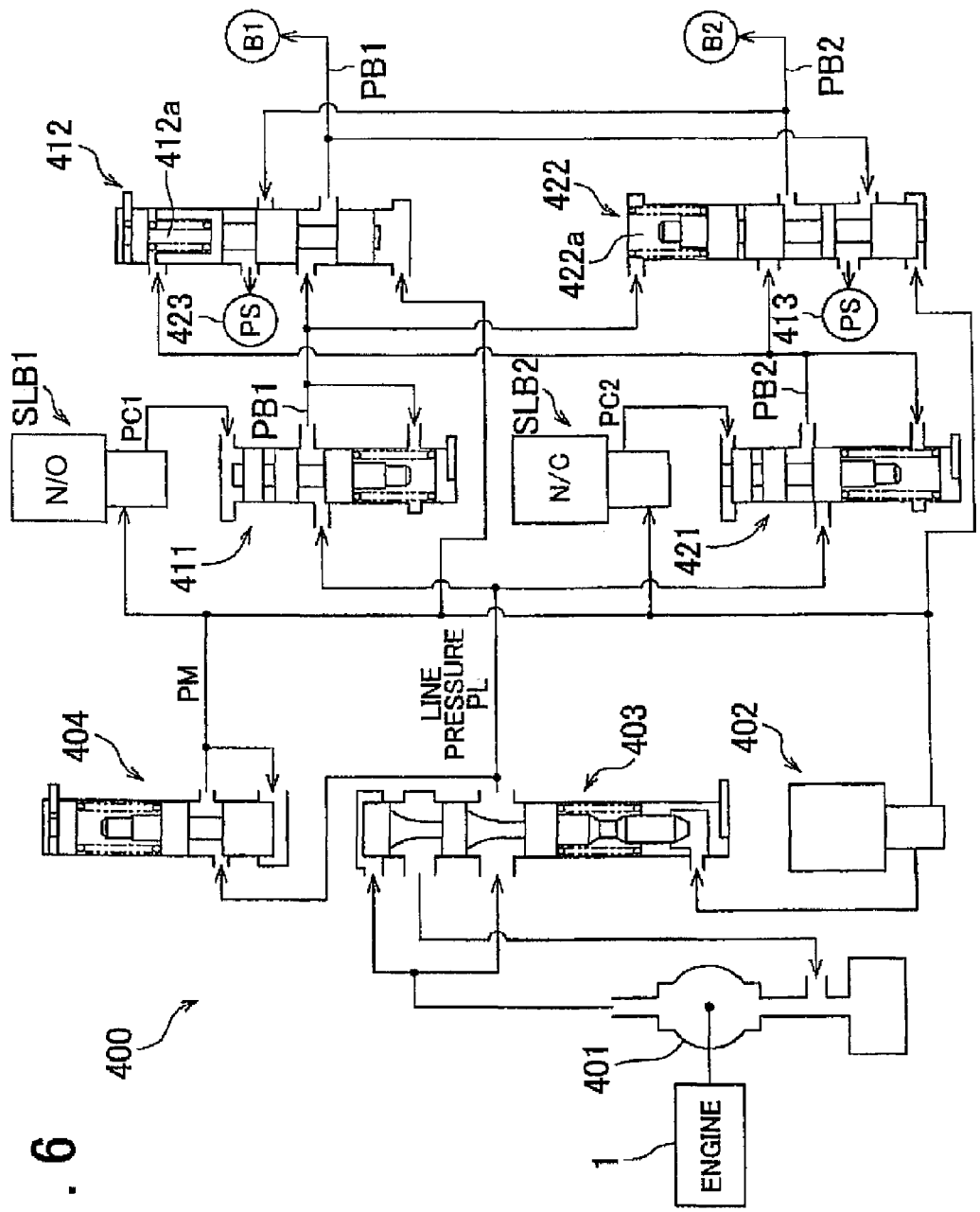
FIG. 6 is a circuit configuration diagram that shows part of a hydraulic control circuit of the transmission mounted on the vehicle shown in FIG. 1.

Next, the hydraulic control circuit 400 of the transmission 4 will be described with reference to FIG. 6. The hydraulic control circuit 400 in this example includes the mechanical oil pump 401 as a hydraulic pressure source. The mechanical oil pump 401 is driven for rotation by the engine 1 and feeds oil (automatic transmission fluid (ATF)) under pressure with pressure feed performance sufficient to actuate the brakes B1 and B2.

In addition, the hydraulic control circuit 400 includes a three-way solenoid valve 402, a line pressure control valve 403, a modulator valve 404, a first linear solenoid valve SLB1, a B1 control valve 411, a B1 apply control valve 412, a second linear solenoid valve SLB2, a B2 control valve 421, a B2 apply control valve 422, and the like.

The line pressure control valve 403 adjusts the pressure (line pressure PL) of oil, fed under pressure from the mechanical oil pump 401, to a set low or high line pressure (two-level line pressure) on the basis of a hydraulic pressure from the three-way solenoid valve 402.

The modulator valve 404 uses the above line pressure PL as a source pressure, and supplies a set module pressure PM, set to be lower than the low line pressure PL, to input ports of the three-way solenoid valve 402, first linear solenoid valve SLB1 and second linear solenoid valve SLB2 irrespective of fluctuations in the line pressure PL.

The first linear solenoid valve SLB1 is a normally open (N/O) valve that opens (provides fluid communication) between the input port and an output port when no current is supplied. The first linear solenoid valve SLB1 uses the module pressure PM as a source pressure and outputs a control pressure PC1 based on a command signal (driving current) from the hybrid ECU 100 to the B1 control valve 411. The second linear solenoid valve SLB2 is a normally closed (N/C) valve that closes (interrupts fluid communication) between the input port and an output port when no current is supplied. The second linear solenoid valve SLB2 uses the module pressure PM as a source pressure and outputs a control pressure PC2 based on a command signal (driving current) from the hybrid ECU 100 to the B2 control valve 421.

The B1 control valve 411 uses the line pressure PL as a source pressure and supplies a B1 engagement hydraulic pressure PB1 based on the control pressure PC1 from the first linear solenoid valve SLB1 to the brake B1 through the B1 apply control valve 412.

The B2 control valve 421 uses the line pressure PL as a source pressure and supplies a B2 engagement hydraulic pressure PB2 based on the control pressure PC2 from the second linear solenoid valve SLB2 to the brake B2 through the B2 apply control valve 422.

The B1 apply control valve 412 includes an oil chamber 412a that receives the B2 engagement hydraulic pressure PB2 output from the B2 control valve 421. When the B2 engagement hydraulic pressure PB2 is not supplied to the oil chamber 412a, the B1 apply control valve 412 is open, and an oil passage between the B1 control valve 411 and the brake B1 is opened. On the other hand, when the B2 engagement hydraulic pressure PB2 is supplied to the oil chamber 412a, the B1 apply control valve 412 is closed, and engagement of the brake B1 is inhibited.

In addition, a brake B2 hydraulic pressure switch (PS) 423 is connected to the B1 apply control valve 412. The hydraulic pressure switch 423 enters an On state when the B2 engagement hydraulic pressure PB2 is supplied to the brake B2 and the hydraulic pressure of the brake B2 is higher than or equal to a predetermined threshold, and enters an Off state when the B2 engagement hydraulic pressure P132 is not supplied to the brake B2 and the hydraulic pressure of the brake B2 has decreased to a value lower than the above threshold. An On signal or an Off signal of the hydraulic pressure switch 423 is input to the hybrid ECU 100. Note that the threshold (hydraulic pressure decrease detection threshold) of the hydraulic pressure switch 423 is set to a lower limit value of hydraulic pressure (actuating pressure) required to engage the brake B2.

The B2 apply control valve 422 includes an oil chamber 422a that receives the B1 engagement hydraulic pressure PB1 output from the B1 control valve 411. When the B1 engagement hydraulic pressure PB1 is not supplied to the oil chamber 422a, the B2 apply control valve 422 is open, and an oil passage between the B2 control valve 421 and the brake B2 is opened. On the other hand, when the B1 engagement hydraulic pressure PB1 is supplied to the oil chamber 422a, the B2 apply control valve 422 is closed, and engagement of the brake B2 is inhibited.

In addition, a brake B1 hydraulic pressure switch (PS) 413 is connected to the B2 apply control valve 422. The hydraulic pressure switch 413 enters an On state when the B1 engagement hydraulic pressure PB1 is supplied to the brake B1 and the hydraulic pressure of the brake B1 is higher than or equal to a predetermined threshold, and enters an Off state when the B1 engagement hydraulic pressure PB1 is not supplied to the brake B1 and the hydraulic pressure of the brake B1 has decreased to a value lower than the above threshold. An On signal or an Off signal of the hydraulic pressure switch 413 is input to the hybrid ECU 100. Note that the threshold (hydraulic pressure decrease detection threshold) of the hydraulic pressure switch 413 is set to a lower limit value of hydraulic pressure (actuating pressure) required to engage the brake B1.

Note that, when the mechanical oil pump 401 is stopped, no engagement hydraulic pressures are supplied to both the brake B1 and the brake B2, so both output signals of the brake B1 hydraulic pressure switch 413 and brake B2 hydraulic pressure switch 423 are Off signals.

FIG. 7 is a chart that illustrates the operation of the above-configured hydraulic control circuit 400, that is, a relationship between excitation states (energization states) of the linear solenoid valves SLB1 and SLB2 and operation states of the brakes B1 and B2. In FIG. 7, the mark O indicates an excited state or an engaged state, and the mark x indicates a non-excited state or a released state.

As shown in FIG. 7, when the first linear solenoid valve SLB1 and the second linear solenoid valve SLB2 both are excited, the brake B1 is released, and the brake B2 is engaged. Thus, the low-speed gear Lo of the transmission 4 is established. On the other hand, when the first linear solenoid valve SLB1 and the second linear solenoid valve SLB2 both are not excited, the brake B1 is engaged, and the brake B2 is released. Thus, the high-speed gear Hi of the transmission 4 is established.

Note that the above-described hydraulic control circuit 400 is an example of "an oil passage change unit that at least changes an oil passage of oil supplied to the transmission" according to the invention.

The hybrid vehicle HV in this example includes a shift operating device 8 as shown in FIG. 8. The shift operating device 8 includes a shift lever 81 such that the shift lever 81 is displaceable. The shift operating device 8 in this example has set a forward drive range (D range), a forward brake range (B range), a reverse range (R range) and a neutral range (N range). In the forward brake range, braking force (engine braking) is large while an accelerator is off. A driver is allowed to displace the shift lever 81 to a desired range. Positions of these D range, B range, R range and N range are detected by a shift position sensor 105. An output signal of the shift position sensor 105 is input to the hybrid ECU 100.

In addition, a P position switch 106 is provided near the shift lever 81. The P position switch 106 is used to set a parking position (P position). The P position switch 106 is used to change the shift position between the parking position (P position) and a position other than the parking position (non-P position). When the P position switch 106 is turned on by the driver, a P command signal for shifting the shift position from the "non-P position" to the "P position" is input to the hybrid ECU 100. Note that shift operation from the P position to the non-P position is performed by operating the shift lever 81 (for example, operating the shift lever 81 to the N range, D range or the R range).

The hybrid vehicle HV includes a power switch 107 that is used to change between start and stop of a hybrid system (vehicle system). The power switch 107 is, for example, a snap push switch and, each time the power switch 107 is pushed, the power switch 107 alternately turns on and off. Note that the power switch 107 is an example of "an operating unit" according to the invention.

Here, the hybrid system controls travelling of the hybrid vehicle HV by executing various controls including operation control over the engine 1, drive control over the motor generators MG1 and MG2, coordinate control over the engine 1 and the motor generators MG1 and MG2, and the like.

When a user including the driver operates the power switch 107, the power switch 107 outputs a signal corresponding to the operation (IG-On command signal or IG-Off command signal) to the hybrid ECU 100. The hybrid ECU 100 starts or stops the hybrid system on the basis of, for example, the signal output from the power switch 107.

Specifically, when the IG-On command signal is input through the operation (On operation) of the power switch 107, the hybrid ECU 100 starts the hybrid system. By so doing, the vehicle enters a travelable state (IG-On state). The state where the vehicle is travelable is a state where it is possible to control travelling of the vehicle by a command signal from the hybrid ECU 100, and is a state (Ready-On state) where, when the driver depresses the accelerator, the hybrid vehicle HV is able to start or travel. Note that the Ready-On state also includes a state where the engine 1 is stopped and it is possible to cause the hybrid vehicle HV to start or travel with the use of the second motor generator MG2.

In addition, for example, while the hybrid system is in operation, when the power switch 107 is operated (for example, pushed in a short period of time) in the P position during a stop of the vehicle, the hybrid ECU 100 stops the hybrid system.

Furthermore, in this example, while the hybrid vehicle HV is travelling (while the hybrid system is in operation), when the power switch 107 is operated (depressed for a long period of time, for example, three seconds), it is possible to stop (IG-Off) the hybrid system. In addition, after the hybrid system is stopped (IG-Off) while the vehicle is travelling, when the power switch 107 is operated (On operation is performed), it is possible to restart the hybrid system in response to the restart request (IG-Off→IG-On). When an engine start condition is satisfied at the time of the restart, the engine 1 is restarted.

The hybrid ECU 100 is an electronic control unit that exchanges control signals and data signals with the engine ECU 200 that controls operation of the engine 1 and the MG_ECU 300 that executes drive control over the motor generators MG1 and MG2, and that executes various controls including operation control over the engine 1, drive control over the motor generators MG1 and MG2, coordinate control over the engine 1 and the motor generators MG1 and MG2, and the like.

The hybrid ECU 100 includes a central processing unit (CPU), a read only memory (ROM), a random access memory (RAM), a backup RAM, and the like.

The ROM stores various control programs and maps, and the like, that are consulted at the time when those various control programs are executed. The CPU executes arithmetic processing on the basis of the various control programs and maps stored in the ROM. In addition, the RAM is a memory that temporarily stores computation results in the CPU, data input from sensors, and the like. The backup RAM is a non-volatile memory that stores data, and the like, to be saved, for example, during a stop of the engine 1.

Note that the engine ECU 200 and the MG_ECU 300 each also include a CPU, a ROM, a RAM, a backup RAM, and the like.

As shown in FIG. 2, an engine rotation speed sensor 101, the output shaft rotation speed sensor 102, a throttle opening degree sensor 103, the accelerator operation amount sensor 104, the shift position sensor 105, the P position switch 106, the power switch 107, a current sensor 108, a battery temperature sensor 109, a brake pedal sensor 110, the hydraulic pressure switches 413 and 423, and the like, are connected to the hybrid ECU 100. The engine rotation speed sensor 101 detects the rotation speed of the crankshaft 11 (engine rotation speed) that is the output shaft of the engine 1. The output shaft rotation speed sensor 102 detects the rotation speed of the output shaft 42. The throttle opening degree sensor 103 detects the opening degree of the throttle valve of the engine 1. The accelerator operation amount sensor 104 detects the operation amount of an accelerator pedal. The current sensor 108 detects a charge/discharge current to or from the HV battery 302. The brake pedal sensor 110 detects depression force on a brake pedal (brake depression force). The hydraulic pressure switches 413 and 423 are provided for the hydraulic control circuit 400 that controls the transmission 4. Furthermore, sensors that detect operation states of the engine 1, such as a coolant temperature sensor and an air flow meter, are connected to the hybrid ECU 100. The coolant temperature sensor detects an engine coolant temperature. The air flow meter detects an intake air flow rate. Signals from these sensors are input to the hybrid ECU 100.

Then, in order to manage the HV battery 302, the hybrid ECU 100 computes a state of charge (SOC) of the HV battery 302, an input limit Win and output limit Wout of the HV battery 302, and the like, on the basis of an accumulated value of charge/discharge current detected by the current sensor 108, the battery temperature detected by the battery temperature sensor 109, and the like. In addition, the hybrid ECU 100, for example, outputs command signals (driving current command values) for controlling operations of the first linear solenoid valve SLB1, second linear solenoid valve SLB2, and the like, to the hydraulic control circuit 400 of the transmission 4.

Furthermore, the hybrid ECU 100 transmits an output request to the engine ECU 200 and the MG_ECU 300 to control driving force on the basis of output signals from the various sensors. Specifically, for example, when the hybrid system is started (Ready-On) by operating the power switch 107 in a state where the brake pedal is operated, a driver's request driving force Tr is calculated on the basis of an accelerator operation amount Acc, a vehicle speed V, and the like, and an output request is transmitted to the engine ECU 200 and the MG_ECU 300 to execute drive control over the engine 1, the first motor generator MG1 and the second motor generator MG2 such that the request driving force Tr is obtained.

Specifically, for example, the drive mode is changed among the following drive modes on the basis of a travelling state of the vehicle. The drive modes include (1) an assist drive mode in which the engine 1 is operated along an optimal fuel consumption curve to generate driving force and an insufficient amount with respect to the request driving force Tr is assisted by the second motor generator MG2, (2) a start/acceleration mode in which, when the request driving force Tr is increased, that is, at the time of starting or acceleration, the output torque of the engine 1 and the regenerative braking torque of the first motor generator MG1 both are increased, and the power running torque of the second motor generator MG2 is increased, (3) a motor drive mode (EV drive mode) in which the second motor generator MG2 is used as a power source in a state where the engine 1 is stopped, (4) a charging drive mode in which the vehicle is caused to travel using the second motor generator MG2 as a power source while electric power is generated by the first motor generator MG1 through the power of the engine 1, and (5) an engine drive mode in which the vehicle travels by mechanically transmitting the power of the engine 1 to the drive wheels 7R and 7L.

In addition, the hybrid ECU 100 controls the engine rotation speed with the use of the first motor generator MG1 such that the engine 1 operates along the optimal fuel consumption curve.

Furthermore, when the second motor generator MG2 is driven to assist torque, the hybrid ECU 100 executes control for, when the vehicle speed V is low, increasing torque added to the output shaft 42 by setting the gear of the transmission 4 to the low-speed gear Lo, and, when the vehicle speed V becomes high, reducing a loss to efficiently assist torque by setting the gear of the transmission 4 to the high-speed gear Hi to relatively decrease the rotation speed of the second motor generator MG2. In addition, during coasting (during deceleration), the first motor generator MG1 and/or the second motor generator MG2 are driven for rotation by inertial energy of the hybrid vehicle HV to regenerate electric power, and the HV battery 302 is charged with the regenerated electric power. Note that reverse travelling is, for example, achieved by driving the second motor generator MG2 for rotation in the reverse direction in a state where the transmission 4 is set to the low-speed gear Lo. At this time, the first motor generator MG1 is placed in no load or minimum torque, and reverse rotation of the output shaft 42 is allowed irrespective of the operation state of the engine 1.

Furthermore, the hybrid ECU 100 executes the following process of starting the hybrid system. The process of starting the hybrid system in the hybrid vehicle HV will be described separately in the case where the vehicle is stopped and in the case where the vehicle is travelling. The following processes are executed by the hybrid ECU 100.

First, the start-up process during a stop of the vehicle will be described. During a stop of the vehicle, when the power switch 107 is operated (for example, pushed for a short period of time) in a state where the brake pedal is depressed (recognized through the output signal from the brake pedal sensor 110), the process of starting the hybrid system is started. When the hybrid system is started, first, a preset system check is carried out, and, when the system check is complete, a system main relay (not shown) is connected. The system main relay is used to connect or interrupt the HV battery 302 to or from the inverter 301. When the system main relay is connected, the motor generators MG1 and MG2 are drivable by electric power supplied from the HV battery 302, and the fly battery 302 is chargeable with electric power generated by the motor generators MG1 and MG2.

When the engine 1 is cold or when the SOC of the HV battery 302 is low, that is, when the EV travelling condition is not satisfied (the engine start condition is satisfied), the engine 1 is started. Note that the engine 1 is started by the first motor generator MG1 driven by electric power from the HV battery 302. After that, the vehicle enters a Ready-On state (travelable state), and an indicator lamp that indicates the Ready-On state lights up on a combination meter (not shown).

On the other hand, when the engine 1 does not need to be warmed up and the HV battery 302 does not need to be charged, that is, when the EV travelling condition is satisfied, the vehicle enters the Ready-On state without starting the engine 1, and the indicator lamp that indicates the Ready-On state lights up on the combination meter.

Next, the process of starting the hybrid system while the vehicle is travelling will be described. In the present embodiment, while the hybrid vehicle HV is travelling, when a passenger (user) including the driver operates the power switch 107 (performs Off operation), the hybrid system is stopped (IG-Off state). In addition, after that (after IG-Off while travelling), when the power switch 107 is operated (IG-On operation is performed), the hybrid system is able to be restarted, and, at the time of the restart, when the EV travelling condition is not satisfied (the engine start condition is satisfied), the engine 1 is started.

Here, in the hybrid vehicle HV in this example, the hydraulic pressure applied to the transmission 4 (hydraulic control circuit 400) is supplied by the mechanical oil pump 401 that is driven by the power of the engine 1. Therefore, when the vehicle enters the IG-Off state while travelling and the engine is stopped, the mechanical oil pump 401 also stops accordingly, so the hydraulic pressure applied to the transmission 4 decreases, and the brakes B1 and B2 (frictional engagement elements) are released.

Then, in such a situation (both the brakes B1 and B2 of the transmission 4 are released), when the hybrid system is restarted and the engine is restarted, the hydraulic pressure applied to the transmission 4 (hydraulic control circuit 400) rises accordingly, and the transmission 4 engages (the brake B1 or B2 engages) while the vehicle is travelling. At this time, the output shaft 42 is driven for rotation by the drive wheels 7R and 7L, so there is a difference between the rotation speed of the output shaft 42 and the rotation speed of the input shaft 41 of the transmission 4 (second motor generator MG2). When the transmission 4 engages (when the Lo-side brake B2 engages) in such a state where there is a difference in rotation speed, a shock may occur at the time of the engagement. In addition, there is a concern about a drag of the engagement portion (brake B2) of the transmission 4. As measures against the above inconveniences, it is conceivable to execute control (synchronization control) for driving the second motor generator MG2 coupled to the input shaft 41 of the transmission 4 to cause the rotation speed of the input shaft 41 of the transmission 4 to match with the rotation speed of the output shaft 42. In this case, when the second motor generator MG2 cannot be driven (torque cannot be output) due to an output limit Wout of the HV battery 302 at low temperatures, it is not possible to reduce an engagement shock at the time of a restart of the engine 1 or a drag of the engagement portion.

In consideration of the above point, in the present embodiment, when the hybrid system stops (IG-Off) while the vehicle is travelling, it is possible to reliably reduce an engagement shock that occurs at the time of a restart of the engine and a drag of the engagement portion of the transmission 4. An example of the control (control in the case where IG-Off is operated while the vehicle is travelling) will be described with reference to the flowchart of FIG. 9.

Figure 9:
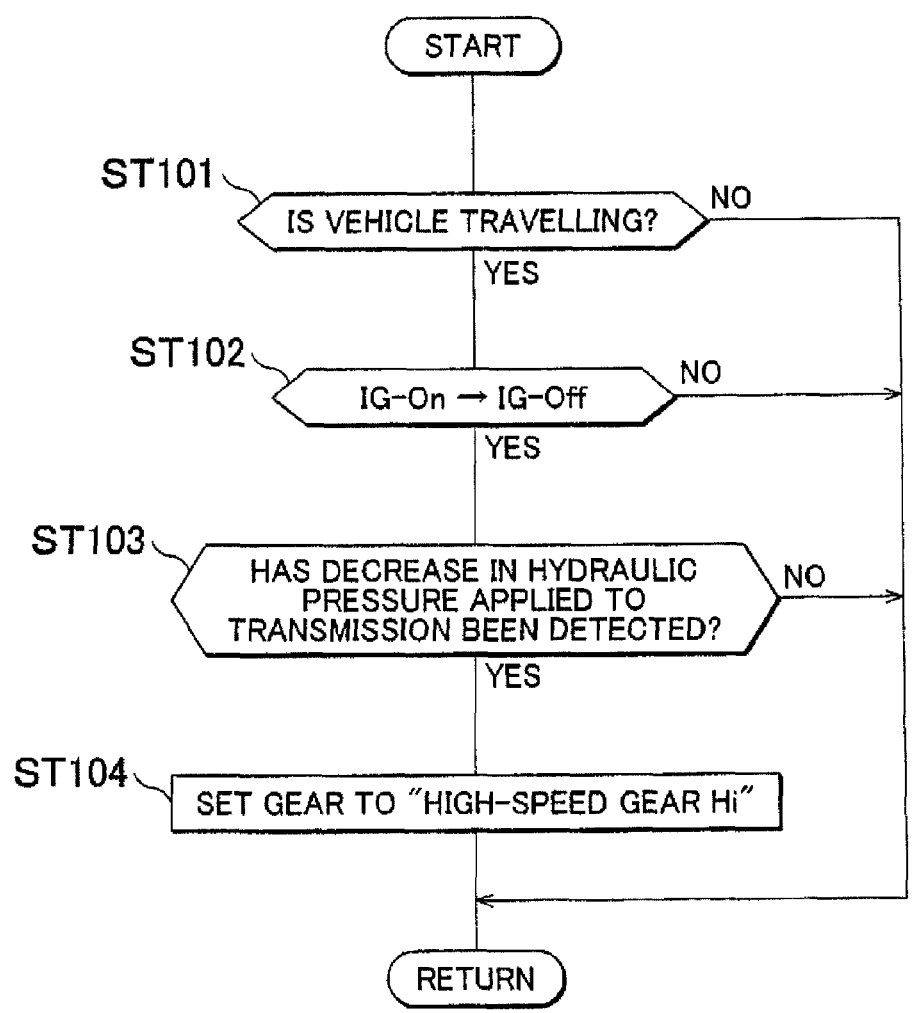
FIG. 9 is a flowchart that shows an example of control in the case where IG-Off is performed while the vehicle is travelling.

A control routine shown in FIG. 9 is repeatedly executed by the hybrid ECU 100 at predetermined intervals (for example, intervals of several milliseconds). Note that, in this example, control in the case where the vehicle is travelling using the power of the engine 1 (including a state where the vehicle is travelling using both "the engine and the motor") will be described.

When the control routine shown in FIG. 9, first, in step ST101, it is determined whether the hybrid vehicle HV is travelling on the basis of the vehicle speed V calculated from the output signal from the output shaft rotation speed sensor 102. When the determination result is negative (NO), the process returns. When the determination result in step ST101 is affirmative (YES) (that is, while the vehicle is travelling), the process proceeds to step ST102.

In step ST102, while the vehicle is travelling (while the hybrid system is in operation), it is determined whether IG-Off is conducted by operating the power switch 107, and, when the determination result is negative (NO), the process returns. When the determination result in step ST102 is affirmative (YES) (that is, when "IG-On→IG-Off" operation is performed while travelling), the process proceeds to step ST103. Note that, as an example in which IG-Off operation is performed (operation to stop the hybrid system is performed) white travelling, for example, erroneous operation of the power switch 107 by the passenger including the driver is conceivable.

Here, when IG-Off operation is performed while the vehicle is travelling, the hybrid system is stopped. The process of stopping the hybrid system, for example, includes stopping the engine 1 through fuel cut, or the like, stopping the motor generators MG1 and MG2 through gate interruption of the inverter 301, interrupting the system main relay, and the like.

In step ST103, it is determined whether the hydraulic pressure applied to the transmission 4 (hydraulic control circuit 400) has decreased (the amount of discharge of the oil pump is reduced). Specifically, it is determined whether both the signals of the hydraulic pressure switch 413 (for the brake B1) and hydraulic pressure switch 423 (for the brake B2) of the hydraulic control circuit 400 are Off signals. When both signals are Off signals, it is determined that the hydraulic pressure applied to the transmission 4 has decreased (decrease in the hydraulic pressure has been detected), and then the process proceeds to step ST104. When the determination result in step ST103 is negative (NO), the process returns.

In step ST104, control for setting the gear of the transmission 4 to the high-speed gear Hi (setting the speed ratio to a minimum speed ratio) is executed. Specifically, control for setting the high-speed gear Hi (see FIG. 7) by bringing both the first linear solenoid valve SLB1 and the second linear solenoid valve SLB2 into a non-excited state (non-energized state) (control for changing the oil passage such that the speed ratio of the transmission 4 is decreased (control over the oil passage change unit (hydraulic control circuit 400))) is executed. The control for setting the gear to the high-speed gear Hi (bringing the linear solenoid valves SLB1 and SLB2 into a non-excited state) is an example of "control for setting the speed ratio of the transmission to a predetermined low speed ratio" according to the invention. Note that, at the time of control for setting the gear to the high-speed gear Hi (bringing the linear solenoid valves SLB1 and SLB2 into a non-excited state), the hydraulic pressure applied to the transmission 4 has not risen yet, and both the brake B1 and the brake B2 are released.

Then, after executing such control, the engine 1 is restarted (when the EV travelling condition is satisfied, the process returns without a restart of the engine 1). When the engine 1 is started, the mechanical oil pump 401 is driven accordingly, and the hydraulic pressure applied to the transmission 4 (hydraulic control circuit 400) rises. By so doing, the brake B1 of the transmission 4 is engaged (the brake B2 is released), and the gear of the transmission 4 becomes the high-speed gear Hi.

By setting the gear of the transmission 4 to the high-speed gear Hi to set the speed ratio to a minimum value in this way, even when there is a difference between the rotation speed of the input shaft 41 of the transmission 4 and the rotation speed of the output shaft 42 of the transmission 4 at the time of a restart of the engine 1 (at the time when the hydraulic pressure rises), it is possible to reduce an engagement shock of the transmission 4 due to the difference in rotation as compared with the case where the gear is the low-speed gear Lo (the speed ratio is high). In addition, it is possible to reduce a drag of the engagement portion (brake B1 or B2) of the transmission 4, so it is possible to reduce the influence (abrasion, or the like) on the engagement faces. In addition, even when the second motor generator MG2 cannot be driven (torque cannot be output) due to the output limit Wout of the HV battery 302 at low temperatures, it is possible to reduce an engagement shock and a drag of the engagement portion at the time of a restart of the engine 1 after IG-Off while travelling.

Note that, when affirmative determination is made in step ST102, that is, at the time of "IG-On→IG-Off" operation, and when the gear of the transmission 4 is the high-speed gear Hi (when the speed ratio is a minimum speed ratio), the linear solenoid valves SLB1 and SLB2 of the hydraulic control circuit 400 are controlled such that it is possible to keep the set high-speed gear Hi as it is (kept in the non-excited state).

Here, in the present embodiment, even when a decrease in the hydraulic pressure applied to the transmission 4 (hydraulic control circuit 400) has been detected after IG-Off is conducted (the hybrid system is stopped) while the vehicle is travelling, when, at the time of the IG-Off, there is an allowance for the output limit Wout of the HV battery 302 and it is possible to execute control (synchronization control) for causing the rotation speed of the input shaft 41 of the transmission 4 to match with the rotation speed of the output shaft 42 of the transmission 4 by driving (outputting torque from) the second motor generator MG2, the control may be executed to keep the gear of the transmission 4 at the gear (the low-speed gear Lo or the high-speed gear Hi) at the time of the IG-Off.

Next, an alternative example of control in the case where IG-Off is conducted while the vehicle is travelling will be described. The control in this alternative example has such a feature that, after IG-Off is conducted (the hybrid system is stopped) while the vehicle is travelling, when IG-On operation (a restart request) is performed and a decrease in the hydraulic pressure applied to the transmission 4 has been detected, control for setting the gear of the transmission 4 to the high-speed gear Hi (setting the speed ratio to a minimum speed ratio) is executed.

An example of the control will be described with reference to the flowchart of FIG. 10. A control routine shown in FIG. 10 is executable on the hybrid ECU 100.

Figure 10:
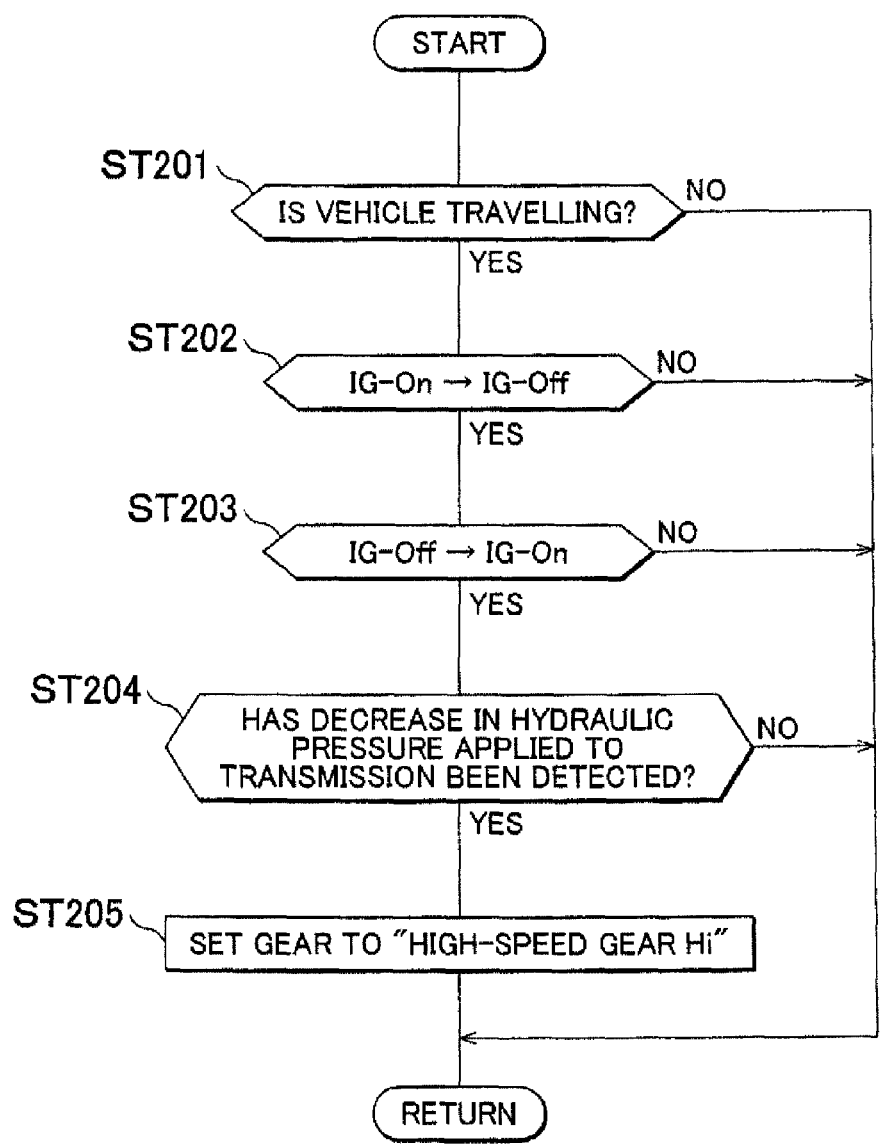
FIG. 10 is a flowchart that shows another example of control in the case where IG-Off is performed while the vehicle is travelling.

The processes of step ST201 and step ST202 shown in FIG. 10 are respectively the same as the processes of step ST101 and step ST102 of the above-described flowchart of FIG. 9.

In this example, when the determination result in step ST202 is affirmative (YES), that is, when IG-Off is conducted by operating the power switch 107 while the hybrid vehicle HV is travelling, the process proceeds to step ST203.

In step ST203, after IG-Off operation while travelling, it is determined whether IG-On (restart request) operation is conducted by operating the power switch 107, and, when the determination result is negative (NO), the process returns. When the determination result in step ST203 is affirmative (YES) (in the case of "IG-Off→IG-On" operation), the processes of step ST204 and step ST205 are executed. That is, in step ST204, it is determined whether the hydraulic pressure applied to the transmission 4 (hydraulic control circuit 400) has decreased, and, when there is a decrease in the hydraulic pressure, the process proceeds to step ST205. In step ST205, control for setting the gear of the transmission 4 to the high-speed gear Hi (setting the speed ratio to a minimum speed ratio) is executed. Then, after executing such control, the engine 1 is restarted.

Note that the process of step ST204 and step ST205 are the same as the processes of step ST103 and step ST104 in the above-described flowchart of FIG. 9, so the detailed description is omitted.

With the control in this example, the engine 1 is restarted in response to a restart request (IG-Off→IG-On) after IG-Off while travelling, and, when the hydraulic pressure applied to the transmission 4 (hydraulic control circuit 400) has risen, the gear of the transmission 4 is set to the high-speed gear Hi (the speed ratio is set to a minimum speed ratio). Therefore, in comparison with the case where the gear of the transmission 4 is the low-speed gear Lo at the time of a restart of the engine 1, it is possible to reduce an engagement shock of the transmission 4 at the time when the hydraulic pressure rises. In addition, it is possible to reduce a drag of the engagement portion (brake B1 or B2) of the transmission 4, so it is possible to reduce the influence (abrasion, or the like) on the engagement faces. In addition, even when the second motor generator MG2 cannot be driven (torque cannot be output) due to the output limit Wout of the HV battery 302 at low temperatures, it is possible to reduce an engagement shock and a drag of the engagement portion at the time of a restart of the engine 1 after IG-Off while travelling.

Note that, in this example as well, when affirmative determination is made in step ST202, that is, at the time of "IG-On→IG-Off" operation, and when the gear of the transmission 4 is the high-speed gear Hi (when the speed ratio is a minimum speed ratio), the linear solenoid valves SLB1 and SLB2 of the hydraulic control circuit 400 are controlled such that it is possible to keep the set high-speed gear Hi as it is (kept in the non-excited state).

In addition, in the control in this example as well, even when a decrease in the hydraulic pressure applied to the transmission 4 (hydraulic control circuit 400) has been detected after IG-Off is conducted (the hybrid system is stopped) while the vehicle is travelling, when, at the time of the IG-Off, there is an allowance for the output limit Wout of the HV battery 302 and it is possible to execute control (synchronization control) for causing the rotation speed of the input shaft 41 of the transmission 4 to match with the rotation speed of the output shaft 42 of the transmission 4 by driving (outputting torque from) the second motor generator MG2, the control may be executed to keep the gear of the transmission 4 at the gear (the low-speed gear Lo or the high-speed gear Hi) at the time of the IG-Off.

In the above-described embodiments, a decrease in the hydraulic pressure applied to the transmission 4 (hydraulic control circuit 400) (a decrease in the hydraulic pressures respectively applied to the brakes B1 and B2) is detected with the use of the output signal from the hydraulic pressure switch 413 or 423 that detects the hydraulic pressures respectively applied to the brakes B1 and B2; however, the invention is not limited to this configuration. Then, embodiments other than the above-described embodiment will be described below. For example, it is applicable that a hydraulic pressure switch that detects the line pressure PL of the hydraulic control circuit 400 shown in FIG. 6 is provided and a decrease in the hydraulic pressure applied to the transmission 4 is detected using the output signal from the hydraulic pressure switch. In addition, instead of the hydraulic pressure switch, another detecting device, such as a hydraulic pressure sensor, may be used to detect a decrease in the hydraulic pressure applied to the transmission 4.

When the hydraulic pressure sensor is used, it may be determined that the hydraulic pressure applied to the transmission has decreased when the hydraulic pressure detected by the hydraulic pressure sensor is lower than a predetermined determination threshold. Note that, in this case, the determination threshold may be set to a lower limit value of the hydraulic pressure (actuating pressure) required to engage the engagement portion (frictional engagement element) of the transmission.

In the above-described examples, the two-speed transmission that is able to shift the gear of the transmission 4, which is coupled to the second motor generator MG2, between the high-speed gear Hi and the low-speed gear Lo is used; however, the transmission is not limited to this configuration. The invention is applicable to control over a hybrid vehicle that includes a transmission having three or more gears. In this case, when a decrease in the hydraulic pressure applied to the transmission has been detected after IG-Off operation is performed while travelling, the gear of the transmission may be set to a highest gear (the speed ratio may be set to a minimum speed ratio). In addition, the transmission to which the second motor generator MG2 is coupled may be a continuously variable transmission, such as a belt-type continuously variable transmission.

Note that, in the case of a vehicle that includes a transmission having a plurality of gears (for example, five-speed gears) (or a continuously variable transmission), at the time when a decrease in the hydraulic pressure has been detected after IG-Off while travelling, it is desirable to execute control for setting the gear of the transmission to a highest gear (setting the speed ratio to a minimum speed ratio). However, when it is possible to reduce an engagement shock and a drag of the engagement portion, it is applicable to execute control for setting the gear to a gear lower than the highest gear (for example, a gear lower by one speed than the highest gear) (setting the speed ratio to a speed ratio higher by a predetermined amount than a minimum speed ratio).

In the above-described example, the frictional engagement elements that constitute the transmission 4 serve as interrupting mechanisms that are able to interrupt power transmission from the driving force source to the drive wheels; instead, the interrupting mechanisms may be, for example, provided in a power transmission path between the driving force source and the transmission.

Note that the frictional engagement elements that constitute the transmission 4 are examples of "a driving force transmission mechanism that is engaged by supplied oil" according to the invention, and such a driving force transmission mechanism (driving force transmission mechanism engaged by supplied oil) may be, for example, provided in the power transmission path between the driving force source and the transmission.

In the above-described examples, the description is made on the example in which the invention is applied to control over the so-called split-type hybrid vehicle in which the two motor generators MG1 and MG2 and the power split mechanism 3 are mounted; however, the invention is not limited to this configuration. The invention is also applicable to control over a hybrid vehicle that includes a clutch in a driving force transmission path.

Figure 11:
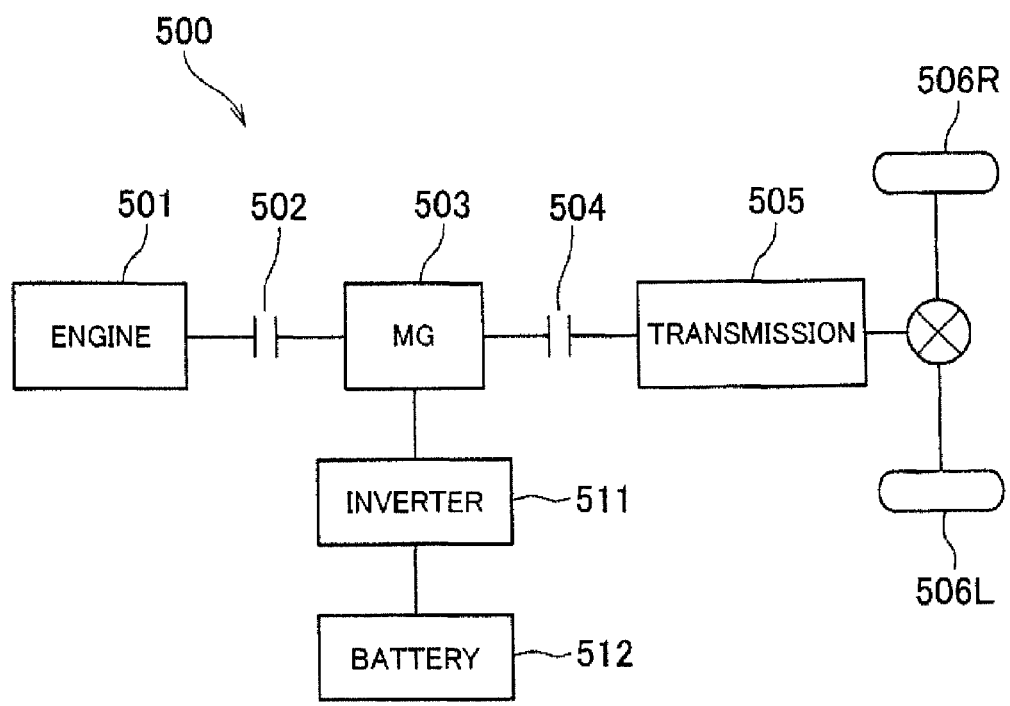
FIG. 11 is a schematic configuration diagram that shows another example of a vehicle to which the control device according to the invention is applied.

An example of the hybrid vehicle is shown in FIG. 11. The hybrid vehicle 500 in this example includes an engine 501, a motor generator (MG) 503, a transmission (a step-gear automatic transmission (for example, forward five speeds), a continuously variable transmission, or the like) 505, an inverter 511, a battery 512, and the like. The motor generator 503 functions as both an electric motor and a generator. The inverter 511 drives the motor generator 503. The battery 512 supplies electric power for driving the motor generator 503, and stores electric power generated by the motor generator 503. The engine 501 and the motor generator 503 are coupled to each other via a first clutch 502. In addition, the motor generator 503 and the transmission 505 are coupled to each other via a second clutch 504.

The hybrid vehicle 500 shown in FIG. 11 is able to drive drive wheels (rear wheels) 506R and 506L only with the use of the motor generator 503 by interrupting (releasing) the first clutch 502 and connecting (engaging) the second clutch 504. In addition, by connecting (engaging) both the first clutch 502 and the second clutch 504, it is possible to drive the drive wheels 506R and 506L by the driving force of the engine 501, and it is possible to carry out charging or generate assist torque with the use of the motor generator 503.

Then, in the hybrid vehicle 500 shown in FIG. 11 as well, when a decrease in the hydraulic pressure applied to the transmission 505 has been detected after IG-Off operation is performed while travelling, control for setting the gear of the transmission 503 to a highest gear (setting the speed ratio to a minimum speed ratio) is executed. By so doing, it is possible to reduce an engagement shock of the transmission 505 and a drag of the engagement portion at the time of a restart of the engine 501 after IG-Off while travelling.

In the above-described examples, the description is made on the example in which the invention is applied to control over the hybrid vehicle that includes the mechanical oil pump; however, the invention is not limited to this configuration. The invention is also applicable to a hybrid vehicle that includes a Mechanical oil pump and an electric oil pump (electric oil pump that is driven by electric power supplied through a startup of the vehicle system). In this case, it may be configured to drive the electric oil pump in response to a restart request (IG-Off→IG-On) for the hybrid system while the vehicle is travelling.

In the above-described examples, the description is made on the example in which the invention is applied to control over the front-engine rear-drive (FR) hybrid vehicle; however, the invention is not limited to this configuration. The invention is also applicable to control over a front-engine front-drive (FF) hybrid vehicle or control over a four-wheel-drive hybrid vehicle.

In the above-described examples, the description is made on the example in which the invention is applied to control over the hybrid vehicle that includes two rotating electrical machine, that is, the first motor generator MG1 and the second motor generator MG2; instead, the invention may also be applied to a hybrid vehicle that include three or more motor generators, at least one of which assists driving force for driving the vehicle. Note that the invention is also applicable to a conventional vehicle that includes only an engine as a driving force source.

The invention is usable in a control device for a vehicle and, more particularly, is usable in a control device for a hybrid vehicle that includes an engine and an electric motor as driving force sources and in which the electric motor is coupled to a drive wheel via a transmission.

What is claimed is:

1. A control device for a vehicle that includes: a driving force source; a hydraulic transmission; and an interrupting mechanism that is able to interrupt power transmission from the driving force source to a drive wheel, the control device comprising:
a controller that is configured to, after the driving force source is stopped while the vehicle is travelling, on the condition that a hydraulic pressure applied to the transmission has decreased, execute control for setting a speed ratio of the transmission to a predetermined low speed ratio while the vehicle is travelling.

2. The control device according to claim 1, wherein
the controller is configured to, after the driving force source is stopped while the vehicle is travelling, on the condition that the hydraulic pressure applied to the transmission has decreased, execute control for setting the speed ratio of the transmission to a minimum speed ratio while the vehicle is travelling.

3. The control device according to claim 1, wherein
the controller is applied to the vehicle that includes an engine and an electric motor as the driving force source and the hydraulic transmission and in which the electric motor is coupled to the drive wheel via the transmission, and
the controller is configured to, after the driving force source is stopped while the vehicle is travelling, on the condition that the hydraulic pressure applied to the transmission has decreased, execute control for setting the speed ratio of the transmission to the predetermined low speed ratio while the vehicle is travelling.

4. The control device according to claim 3, wherein
the controller is configured to, after the driving force source is stopped while the vehicle is travelling, on the condition that the hydraulic pressure applied to the transmission has decreased, execute control for setting the speed ratio of the transmission to a minimum speed ratio while the vehicle is travelling.

5. The control device according to claim 3, wherein
the controller is configured to change the speed ratio by engaging or releasing a plurality of frictional engagement elements of the transmission with the use of a hydraulic pressure supplied from an oil pump,
the control device further comprises a hydraulic pressure decrease detecting unit that detects that all the hydraulic pressures respectively applied to the plurality of frictional engagement elements of the transmission have decreased to a hydraulic pressure at which the frictional engagement elements are released, and
the controller is configured to, after the driving force source is stopped while the vehicle is travelling, when the hydraulic pressure decrease detecting unit has detected a decrease in the hydraulic pressure applied to the transmission while the vehicle is travelling, execute control for setting the speed ratio of the transmission to the predetermined low speed ratio while the vehicle is travelling.

6. The control device according to claim 5, wherein
the controller is configured to, after the driving force source is stopped while the vehicle is travelling, when the hydraulic pressure decrease detecting unit has detected a decrease in the hydraulic pressure applied to the transmission while the vehicle is travelling, execute control for setting the speed ratio of the transmission to a minimum speed ratio while the vehicle is travelling.

7. The control device according to claim 1, wherein
the controller is configured to, after the driving force source is stopped while the vehicle is travelling, when there is a request to restart the driving force source and the hydraulic pressure applied to the transmission has decreased, execute control for setting the speed ratio of the transmission to the predetermined low speed ratio while the vehicle is travelling and then restart the driving force source while the vehicle is travelling.

8. The control device according to claim 7, wherein
the controller is configured to, after the driving force source is stopped while the vehicle is travelling, when there is a request to restart the driving force source and the hydraulic pressure applied to the transmission has decreased, execute control for setting the speed ratio of the transmission to a minimum speed ratio while the vehicle is travelling and then restart the driving force source while the vehicle is travelling.

9. The control device according to claim 7, wherein
the controller is configured to change the speed ratio by engaging or releasing a plurality of frictional engagement elements of the transmission with the use of a hydraulic pressure supplied from an oil pump,
the control device further comprises a hydraulic pressure decrease detecting unit that detects that all the hydraulic pressures respectively applied to the plurality of frictional engagement elements of the transmission have decreased to a hydraulic pressure at which the frictional engagement elements are released, and
the controller is configured to, after the driving force source is stopped while the vehicle is travelling, when the hydraulic pressure decrease detecting unit has detected a decrease in the hydraulic pressure applied to the transmission while the vehicle is travelling, execute control for setting the speed ratio of the transmission to the predetermined low speed ratio while the vehicle is travelling.

10. The control device according to claim 9, wherein
the controller is configured to, after the driving force source is stopped while the vehicle is travelling, when the hydraulic pressure decrease detecting unit has detected a decrease in the hydraulic pressure applied to the transmission while the vehicle is travelling, execute control for setting the speed ratio of the transmission to a minimum speed ratio while the vehicle is travelling.

11. A control device for a vehicle that includes: a driving force source; a transmission that is shiftable by supplied oil; a driving force transmission mechanism that is engaged by supplied oil; an oil passage change unit that at least changes oil passages of oil supplied to the transmission; an oil pump that supplies oil to the transmission and the driving force transmission mechanism; and an operating unit that accepts operation to start and stop a system of the vehicle, the control device comprising:
a controller that is configured to, while the vehicle is travelling, after the system of the vehicle is stopped by operating the operating unit and, accordingly, an amount of discharge of the oil pump is reduced, regulate the oil passage change unit to the oil passage that decreases a speed ratio of the transmission.

12. The control device according to claim 11, wherein
the controller is configured to, while the vehicle is travelling, after the system of the vehicle is stopped by operating the operating unit and, accordingly, the amount of discharge of the oil pump is reduced, regulate the oil passage change unit to the oil passage that minimizes the speed ratio of the transmission.

13. The control device according to claim 11, wherein
the controller is configured to, after the system of the vehicle is stopped by operating the operating unit and, accordingly, the amount of discharge of the oil pump is reduced, and when a restart command is issued by operating the operating unit again, change the oil passage change unit and then allow a restart.

14. The control device according to claim 11, wherein
the controller is configured to, after the system of the vehicle is stopped by operating the operating unit and, accordingly, the amount of discharge of the oil pump is reduced, and when a restart command is issued by operating the operating unit again, change the oil passage change unit and then execute a restart.

* * * * *